United States Patent
Kalra

(10) Patent No.: US 7,421,483 B1
(45) Date of Patent: Sep. 2, 2008

(54) AUTODISCOVERY AND SELF CONFIGURATION OF CUSTOMER PREMISE EQUIPMENT

(75) Inventor: Sanjay Kalra, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 963 days.

(21) Appl. No.: 10/770,113

(22) Filed: Feb. 2, 2004

(51) Int. Cl.
*G06F 15/177* (2006.01)
*G06F 12/00* (2006.01)

(52) U.S. Cl. ...................... 709/220; 709/230
(58) Field of Classification Search ................. 709/220, 709/221, 230, 250
See application file for complete search history.

(56) References Cited

U.S. PATENT DOCUMENTS

| | | | |
|---|---|---|---|
| 6,892,230 B1 * | 5/2005 | Gu et al. | 709/220 |
| 6,975,597 B1 * | 12/2005 | Baker et al. | 370/255 |
| 7,111,054 B2 * | 9/2006 | Lo | 709/220 |
| 7,219,124 B2 * | 5/2007 | Cerami et al. | 709/203 |
| 7,251,215 B1 * | 7/2007 | Turner et al. | 370/231 |
| 7,254,114 B1 * | 8/2007 | Turner et al. | 370/244 |
| 7,272,643 B1 * | 9/2007 | Sarkar et al. | 709/222 |
| 7,293,080 B1 * | 11/2007 | Clemm et al. | 709/223 |
| 2003/0140131 A1 * | 7/2003 | Chandrashekhar et al. | 709/223 |
| 2003/0208609 A1 * | 11/2003 | Brusca | 709/230 |
| 2004/0177133 A1 * | 9/2004 | Harrison et al. | 709/220 |
| 2006/0200532 A1 * | 9/2006 | Skladman et al. | 709/206 |

* cited by examiner

*Primary Examiner*—Zarni Maung
(74) *Attorney, Agent, or Firm*—Shumaker & Sieffert, P.A.

(57) ABSTRACT

A service/device discovery protocol which allows a customer premise device (CPD) to automatically discover other CPDs sharing common service related characteristics, and techniques for self-configuration of the service are described. For example, when a new customer site or CPD is to be added to an existing shared service, the service discovery protocol allows a CPD at the new customer site to automatically discover the other customer sites and/or CPDs associated with the existing shared service. The self-configuration techniques allow the new CPD to automatically configure itself as a member of the shared service, and also allow the existing CPDs to update their service configuration information to include the new customer site and/or CPD.

46 Claims, 5 Drawing Sheets

AUTODISCOVERY AND SELF CONFIGURATION OF CUSTOMER PREMISE EQUIPMENT

TECHNICAL FIELD

The invention relates to computer networks and, more particularly, to techniques for configuring network devices of computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. Certain devices, referred to as routers, maintain routing information that describes routes through the network. A "route" can generally be defined as a path between two locations on the network. Upon receiving an incoming packet, the router examines information within the packet and forwards the packet in accordance with the routing information.

In order to maintain an accurate representation of the network as a whole, routers periodically exchange routing information in accordance with defined protocols. These routing protocols generally fall into two categories. Routers located at the edges of different autonomous systems generally use exterior routing protocols to exchange information. One example of an exterior routing protocol is the Border Gateway Protocol (BGP). Routers within an autonomous system generally utilize interior routing protocols for exchanging routing information. One example of an interior routing protocol is the Intermediate System to Intermediate System (ISIS) protocol, which is an interior gateway routing protocol for IP-based networks. Other examples of interior routing protocols include the Open Shortest Path First (OSPF), and the Routing Information Protocol (RIP).

When two routers initially connect, they typically exchange routing information that describes the routes of which each router is aware. The routers send control messages to incrementally update the routing information when the network topology changes. For example, the routers may send update messages to advertise newly available routes, and to withdraw routes that are no longer available.

Large computer networks, such as the Internet, often include many routers grouped into administrative domains called "autonomous systems." These autonomous systems include service provider networks and customer networks. A service provider network typically includes a management station through which the service provider manually sets up and configures devices in the network, configures and manages services provided, such as virtual private networks, active performance measurement services, inventory management, device management services, Quality of Service (QoS), security services, service level agreements, and/or other services, or otherwise manage operation of the service provider network itself and of the customer networks it serves.

Setting up these services requires significant manual labor. For example, each network device that is part of the service must be manually configured by the service provider. Thus, each time a new service is initiated, or each time a customer premise device is added to an already established service, the service provider must manually configured not only the new customer premise device as part of the service, but must also manually configured all other customer premise devices at every other customer site already part of the service to inform them that the new customer site or device has been added. This process is time consuming and requires significant manual labor.

SUMMARY

In general, the techniques described herein provide a service/device discovery protocol and self-configuration techniques which allow for automatic configuration and management of shared services between geographically separated customer network sites.

The service discovery protocol allows a customer premise device (CPD), such as an edge router of a local area network (LAN) to communicate with an intermediate device, such as an edge router or other network device of a service provider network, which then queries other intermediate devices in the public network to discover other CPDs sharing the same service related characteristics. For example, when a new customer site is to take part in an existing shared service, the service discovery protocol allows a customer premise device at the new customer site, via the public routers of the service provider network, to automatically discover the other customer sites and/or CPDs associated with the existing shared service.

The service/device discovery protocol described herein allows the new customer premise device to automatically configure itself as a member of the shared service based on the service related characteristics and the discovered service information received from the existing CPDs. The self-configuration techniques also allow the existing CPDs to update their service configuration information and to monitor and/or manage the new customer site and/or customer premise device.

In one embodiment, the invention is directed to a method in which service related characteristics associated with a first customer premised device are automatically communicated, and discovered service information associated with at least one other customer premised device that shares the service related characteristics is received by the first customer premise device. In addition, the method may further include automatically configuring a service of the first customer premise device based on the service related characteristics and the discovered service information.

In another embodiment, the invention is directed to a network device in which a control unit automatically communicates the service related characteristics and receives discovered service information concerning at least one other device that shares the service related characteristics.

In another embodiment, the invention is directed to a computer-readable medium containing instructions. The instructions cause a programmable processor to automatically communicate service relates characteristics associated with a first customer premise device from the first customer premise device, and to receive discovered service information associated with at least one other customer premise device that shares the service related characteristics.

The invention ay achieve one or more advantages. For example, the service discovery protocol and self-configuration techniques may reduce or eliminate the need for administrators to manually configure the shared service. First, they may eliminate the requirement of manually discovering all network devices associated with common services. Second, they may eliminate the need to manually configure each and every customer premise device 12 at each customer site 14.

Finally, the need to manually configure each public router 18 associated with a particular service may also be reduced or eliminated.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
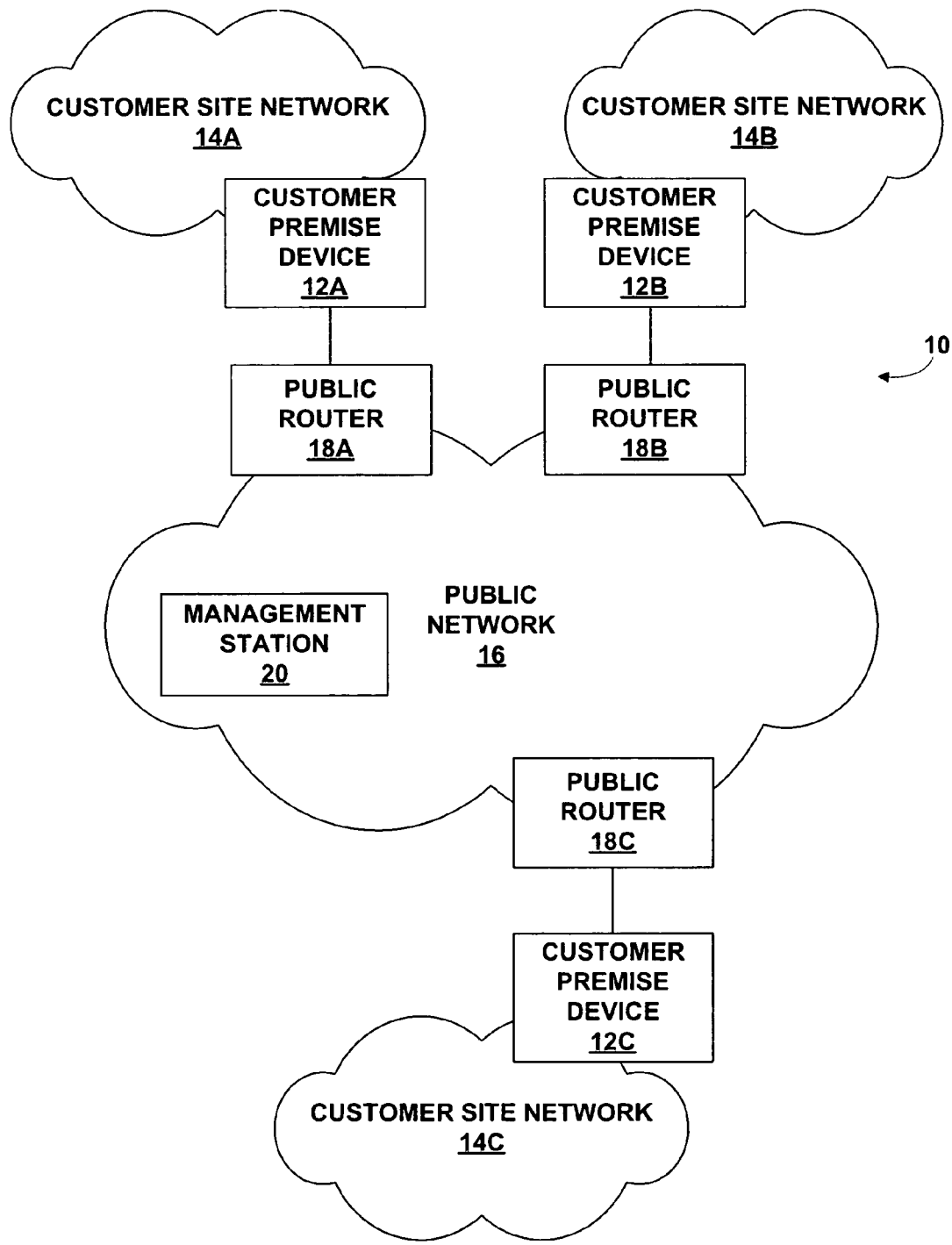
FIG. 1 is a block diagram illustrating an example network environment.

FIG. 1 is a block diagram illustrating an exemplary system 10 in which customer premise device (CPDs) 12A-12C ("12") automatically communicate service related characteristics and discover information associated with other network devices sharing the same service related characteristics. In addition, CPDs 12 may automatically configure one or more services in accordance with the shared service related characteristics. The shared service may be a virtual private network (VPN), active performance measurement services, inventory management, device management services, Quality of Service (QoS), security services, service level agreements, and/or any other service provided by a service provider.

As illustrated in FIG. 1, customer site networks 14A-14C ("14") are coupled to a public network 16 via respective CPDs 12 and public routers 18A-18C ("18"). In one example, CPDs 12 comprise customer edge routers, which may be coupled to respective ones of public edge routers 18. Public network 16 may include one or more autonomous systems (not shown) having a number of devices, such as public routers 18 and switches (not shown), used to forward packets across public network 16. For example, public network 16 may comprise one or more interconnected Internet Service Provider (ISP) networks. Although an actual public network 16 provides services to a large number of dispersed customer site networks 14, for simplicity FIG. 1 shows only three customer site networks 14. Also, it shall be understood that CPDs 12 and public edge routers 18 need not be routers, but may be any device capable of implementing the service/device discovery protocol and automatic configuration techniques described herein.

Customer site networks 14 may be geographically separated sits of the same enterprise, or may be entirely separate networks belonging to different customers. Each of customer site network 14 includes one or more CPDs, such as personal computers, laptop computers, handheld computers, workstations, servers, routers, switches, printers, fax machines, or the like. In the example illustrated in FIG. 1 only a single CPD 12 is shown for exemplary purposes. However, as described above, customer site networks 14 may include a plurality of CPDs. Customer site networks 14 may also include one or more Local Area Networks (LANs), Wide Area Network (WANs), or the like. Although system 10 may include any number of customer site networks 14 coupled to public network 16 by any number of public routers 18. FIG. 1, for simplicity, shows only customer site networks 14 coupled to public network 16 by public routers 18.

Public routers 18 exchange information with one another to collect service related information associated with devices within public network 16 as well as devices, such as CPDs 12, within customer site networks 14. For example, public routers 18 may exchange information in accordance with the service/device discovery protocol described herein. Through this service discovery protocol, each of public routers 18 can identify network devices associated with particular shared services. For example, if customer site networks 14A and 14B are part of the same shared service, public routers 18A and 18B may exchange via the service discovery protocol service related information associated with the shared service.

Public routers 18 may also store the collected service related information . Alternatively, or in addition to storing the collected service related information, public routers 18 may relay the service related information to a management station 20. In this manner, management station 20 may aggregate the service related information from public routers 18 in order to produce comprehensive network service related information. Public routers 18 may periodically exchange service related information or may exchange service related information upon identifying changes in the service related information of the network in order to maintain accurate service related information.

In the event that a new customer site or CPD is to be added to an existing shared service, the techniques described herein allow the shared service to be automatically configured and established. More specifically, CPDs 12 and public routers 18 automatically exchange service related information via a service/device discovery protocol. For example, assume that customer network 14C is to be added to an existing shared service that includes customer site networks 14A and 14B. Upon initially connecting to public network 16, CPD 12C sends at least some of its service related characteristics, including some identifying information, to the corresponding public router 18C via the service discovery protocol. If the shared serviced is a VPN, for example, service related characteristics may include, for example, a site identification, a virtual private network (VPN) identification, topology of the VPN, e.g., hub-spoke or mesh, information about CPD 12A, e.g., product type, version, and the like, IP address. Quality of Service (QoS) information, and type of VPN, e.g., IP sec, GRE, layer 3, or other similar service information.

Based on the service related characteristics received from CPD 12C, public router 18C automatically queries other public routers 18 in the public network 16 to determine whether they are aware of other CPDs having the same service related characteristics. In this example, public router 18C will query other public routers 18A and 18B to determine whether they know of any other CPDs that are part of the shared service to which customer network 14C is to become a member. Public routers 18A and 18B respond to this query with information associated with CPDs 14A and 12B, respectively, as CPDs sharing common service related characteristics. In this way, CPD 12C and public router 18C use the service discovery protocol to "discover" information about other CPDs sharing common service related characteristics. Once public router 18C receives the discovered information from public routers 18A and 18B regarding the other CPDs 12A and 12B, public router 18C communicates the discovered information to CPD 12C.

Once the discovered information is received, CPD 12C may automatically configure one or more customer services based on the service related characteristics and the discovered information received from public router 18C. For example, CPD 14C may use the discovered information to join the existing shared service established between CPDs 14A and 14B. If the shared service is a hub and spoke type VPN, for instance, CPD 14 C may automatically setup an Internet Protocol Security (IPsec) tunnel to the hub site of the VP (device 14A, for example).

As a result, the service/device discovery protocol may reduce or eliminate the need for administrators to manually configure the shared service. The need to manually discover all network devices associated with common shared services is reduced. The need to manually configure each and every CPD 12 at each customer site 14 may also be reduced or eliminated. Finally, the need to manually configure each public router 18 associated with a particular service may also be reduced or eliminated.

Figure 2:
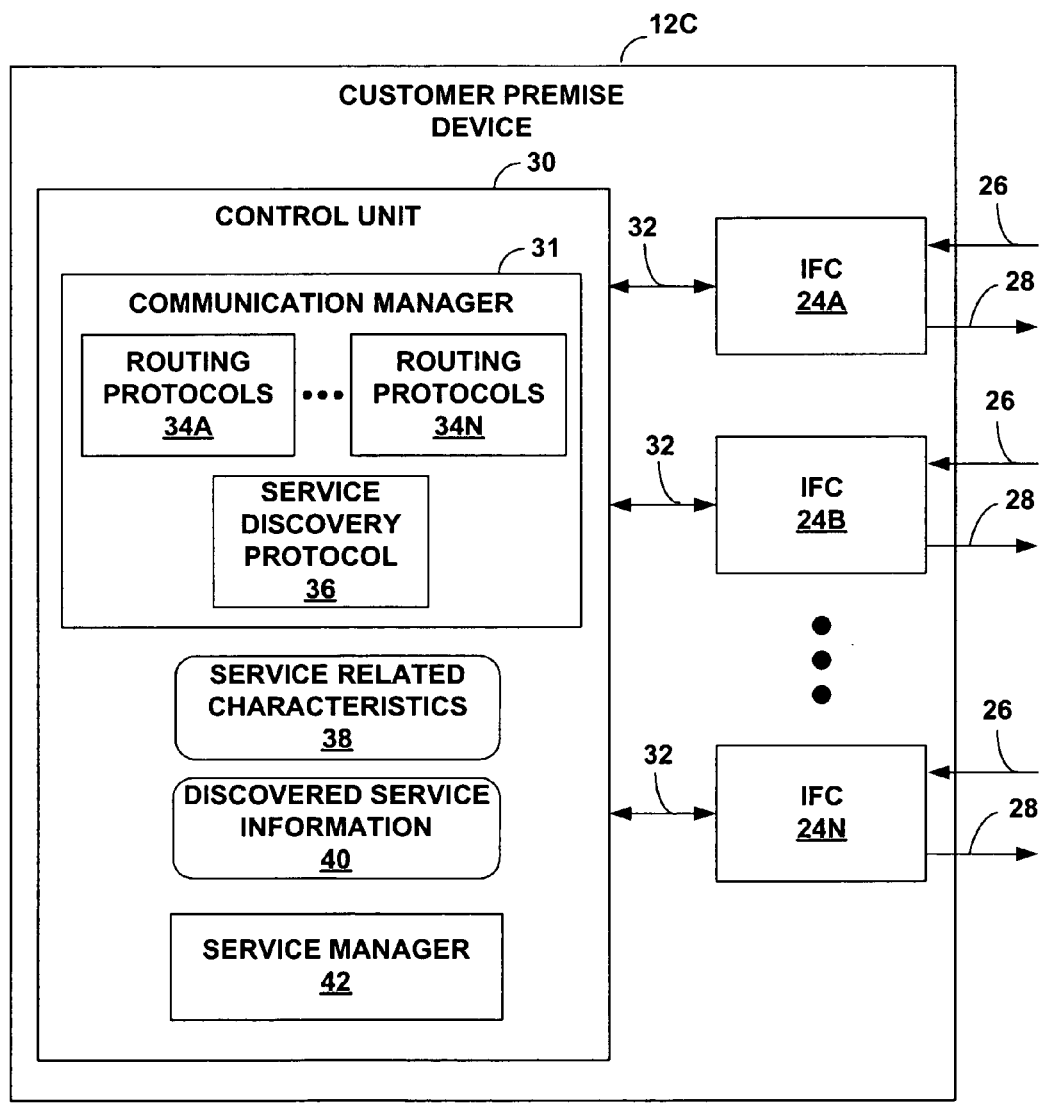
FIG. 2 is a block diagram illustrating an example embodiment of a router that may be configured to operate in accordance with the service discovery protocol and self-configuration techniques described herein.

FIG. 2 is a block diagram illustrating an example CPD 12C that automatically discovers common service relates characteristics associated with other network devices. CPD 12C may communicate with a device belonging to service provider network, such as public router 18C (FIG. 1), in accordance with the presently described service discovery protocol to obtain information regarding other network devices sharing service related characteristics.

In the example embodiment of FIG. 2, CPD 12C includes interface cards (IFCs) 24A-24N ("24") that receive and send data flows via network links 26 and 28, respectively. IFCs 24 are typically coupled to network links 26 and 28 via a number of interface ports (not shown. IFCs 24 communicate with a control unit 30 via one or more physical and/or logical interfaces 32.

CPD 12C includes a communication manager 31 executing within control unit 30 that manages communication sessions with neighboring network devices, such as a public router 18C. Communication manager 31 may, for example, receive routing communications and extract information from the routing communications. In other words, communication manager 31 may implement one or more routing protocols 34A-34N ("34") to learn routes from peer devices, such as other CPDs 14 or public routers 18. Routing protocols 34 may comprise at least one of Intermediate System—Intermediate System (ISIS), Open Shortest Path First (OSPF), Border Gateway Protocol (BGP), Internal Gateway Protocol (IGP), or other similar routing protocol. In some embodiments, control unit 30 includes a routing engine that performs routing functionality for CPD 12C, and a forwarding engine that performs forwarding functionality for the CPD.

In addition, communication manager 31 implements a service discovery protocol 36 that CPD 12C uses to obtain, or "discover," information regarding other network devices sharing common service related characteristics. For example, upon initially connecting to public network 16 (FIG. 1), communication manager 31 automatically accesses service related characteristics 38 and communicates at least a portion of the service related characteristics to public router 18C (FIG. 1 in accordance with service discovery protocol 36. Service related characteristics 38 may, for example, be input by an administrator or automatically via an auto installation process. In either case, service related characteristics 38 may include information associated with and/or required to set up the shared service. In the case of a VPN, for example, the service related characteristics may include a site identification, VPN identification, topology of the VPN, e.g., hub-spoke or mesh, information about CPD 12C, e.g., product type, version, and the like, IP address, Quality of Service (QoS information, and type of VPN, e.g., IPsec, GRE, layer 3, or the like.

Public router 18C, in accordance with service discovery protocol 36, receives and stores the service related characteristics obtained from CPD 12C. In addition, as a further function of service discovery protocol 36, public router 18C automatically queries other public routers 18 in public network 16 to determine whether they have knowledge of any other CPDs 12 sharing common service related characteristics. Once the information regarding any other such devices is discovered, public router communicates the discovered information to CPD 12C. CPD 12C then stores this information as discovered service information 40. For example, if the shared service is a VPN, public router 18C will query and identify other network devices associated with the same VPN as CPD 12C based on the discovered service information obtained from CPD 12C. More specifically, public router 18C may compare the VPN identification of CPD 12C with VPN identification of other network devices, such as CPDs 12A and 12B, and communicate the discovered service information associated with those network devices to CPD 12C.

CPD 12C includes a service manager 42 that automatically configures customer services based on the service related characteristics and the information associated with discovered network devices sharing those service related characteristics. Using VPN services as an example, service manager 42 may identify CPD 12C (FIG. 1) as a spoke device of a hub and spoke VPN, and automatically establish an IPsec tunnel to the hub device of the VPN, for example, CPD 12A. In addition, all other network devices sharing common service related characteristics (i.e., CPDs 12A and 12B) automatically update their service configuration to include CPD 12C. Furthermore, public routers 18A and 18B also automatically update their service configuration information to include the information that public router 18C is connected to a network device (CPD 12C) having service related characteristics in common with their corresponding network devices (CPDs 12A and 12B).

The service/device discovery protocol and automatic configuration techniques may be used to configure any customer service including VPNs, active performance measurement services, device management, inventory management, Quality of Service (QoS) management services, security services, service level agreements, other customer services, or a combination thereof. For example, service manager 42 may automatically configure performance measurement sessions between CPD 12C and other network devices. In addition, the techniques may be used to push new software, QoS, or security information from a public router 18 to an associated CPD 12C. In the case of a new network attack, for example, a public router 18 may push new filters to other associated CPDs 12.

Service discovery protocol 36 continues to communicate with public router 18C in order to receive current service related information associated with other network devices as well as keep public router 18C updated with any service configuration changes made. For example, service discovery protocol 36 may periodically send service configuration information to public router 18C at regular intervals. Alternatively, service discovery protocol 36 may communicate service related information associated with CPD 12C upon receiving updated service related characteristics from a network administrator. In this manner, service discovery protocol 36 keeps CPD 12C updated with the most current service related information associated with other network devices.

Control unit 30 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of CPD 12C may be implemented by executing the instructions of the computer-readable medium with one or more processors, discrete hardware circuitry, firmware, software executing on a programmable processor, or a combination of any of the above.

Figure 3:
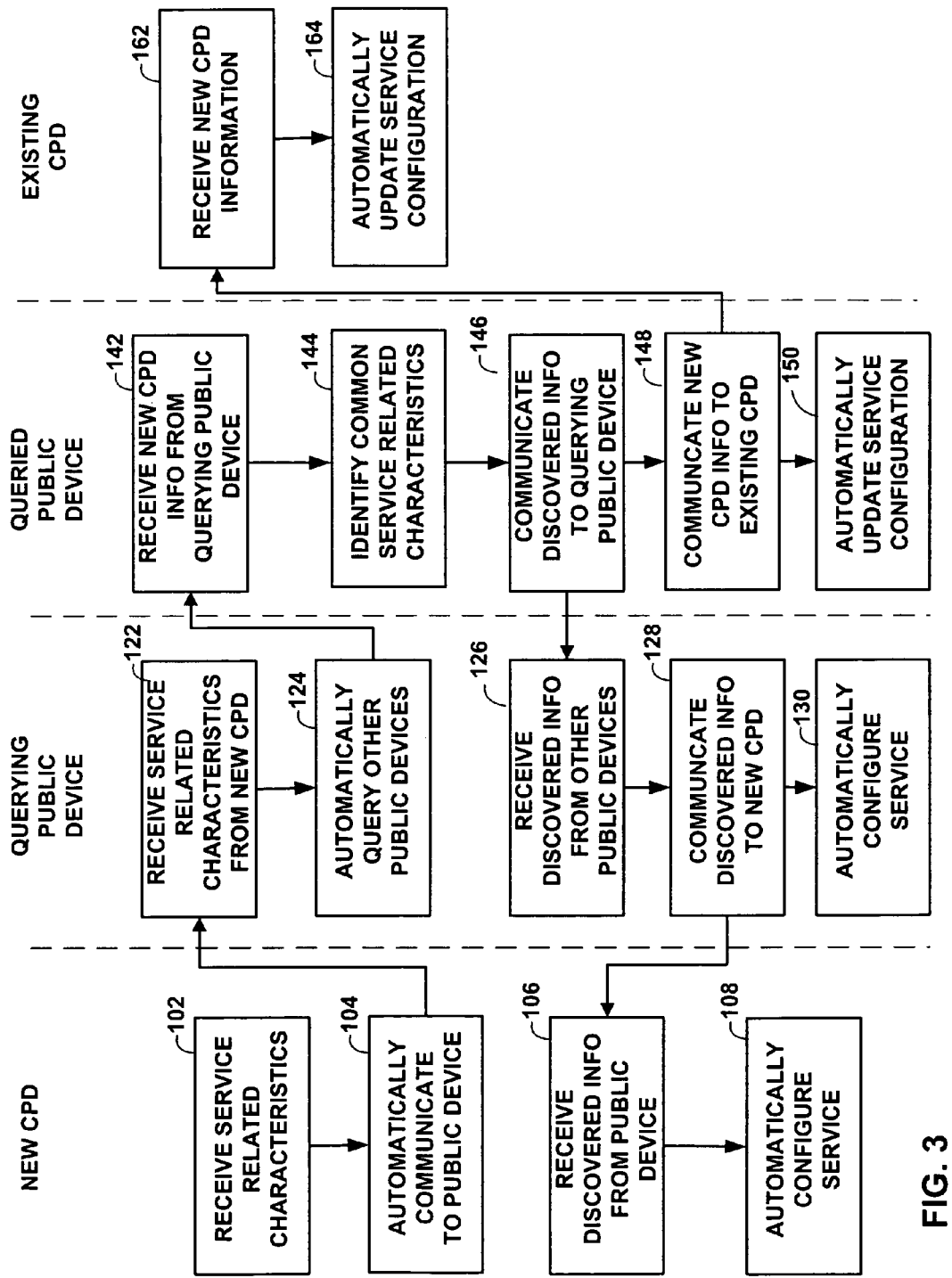
FIG. 3 is a flowchart illustrating operation of the service discovery protocol and self-configuration techniques described herein.

FIG. 3 is a flow diagram illustrating operation of the service discovery protocol described herein. For purposes of illustration, operation of the service discovery protocol is shown with respect to the devices involved when a new CPD is added to an already existing shared service. FIG. 3 is partitioned to illustrate operation throughout a public network with respect to the service discovery protocol described herein. In this example, the flow chart is partitioned to show operation of: (1) a new CPD joining the existing shared service, (2) a public device associated with the new CPD, (3) other public devices in the public network, and (4) other CPDs already part of the existing, established shared service and associated with the other public devices.

To set up the new CPD into the existing shared service, the new CPD initially receives service related characteristics from an administrator (102). The new CPD may receive the service related characteristics from a human administrator or an automated script. The service related characteristics will vary depending upon the type of service.

In accordance with the service discovery protocol, the new CPD automatically communicates at least a portion of its service related characteristics, including some new CPD identifying information, to its associated public device (104). Upon receipt of this information (122), the public device (the "querying" public device queries other public devices (the "queried" public devices) to discover other public devices and CPDs sharing common service related characteristics (124). Each queried public device (140) receives this information (142) and compares it to its own stored information to identify other CDs that share service related characteristics with the new CPD (144). For example, each of the queried public devices may identify other network devices that belong to the same shared service as the new CPD. Any of the queried public devices may, for example, include a data structure that stores service related information associated with other network devices of the network. Each of the public devices may periodically communicate with the other public devices and CPDs to maintain service related information for other network devices of the network.

The queried public devices communicate any discovered information back to the querying public device (146). The queried public devices also notify any corresponding CPDs within the existing shared service about the new CPD (148). The queried public devices also automatically update their respective service configurations to correspond to the addition of the new CPD (150). Upon receipt of the new CPD information (162), the existing CPDs automatically update their service configuration to correspond to the addition of the new CPD (164).

After the querying public device receives the discovered information (126, communicates this information back to the new CPD 128) and automatically configures itself with service information to correspond to the addition of the new CPD to the shared service (130).

Upon receipt of the discovered information (106), the new CPD automatically configures itself to join the existing shared service based on the discovered information (108). For example, if the shared service is a VPN, the new CPD may automatically establish an IPsec tunnel to the hub device of the VPN in the case of a hub and spoke VPN. In another VP example, the new CPD may establish tunnels to each of the network devices belonging to the common VPN in the case of a mesh VPN. Further, the new CPD may configure other customer services including active performance measurement services, inventory management services, device management services, security services, service level agreements, or a combination thereof.

Figure 4:
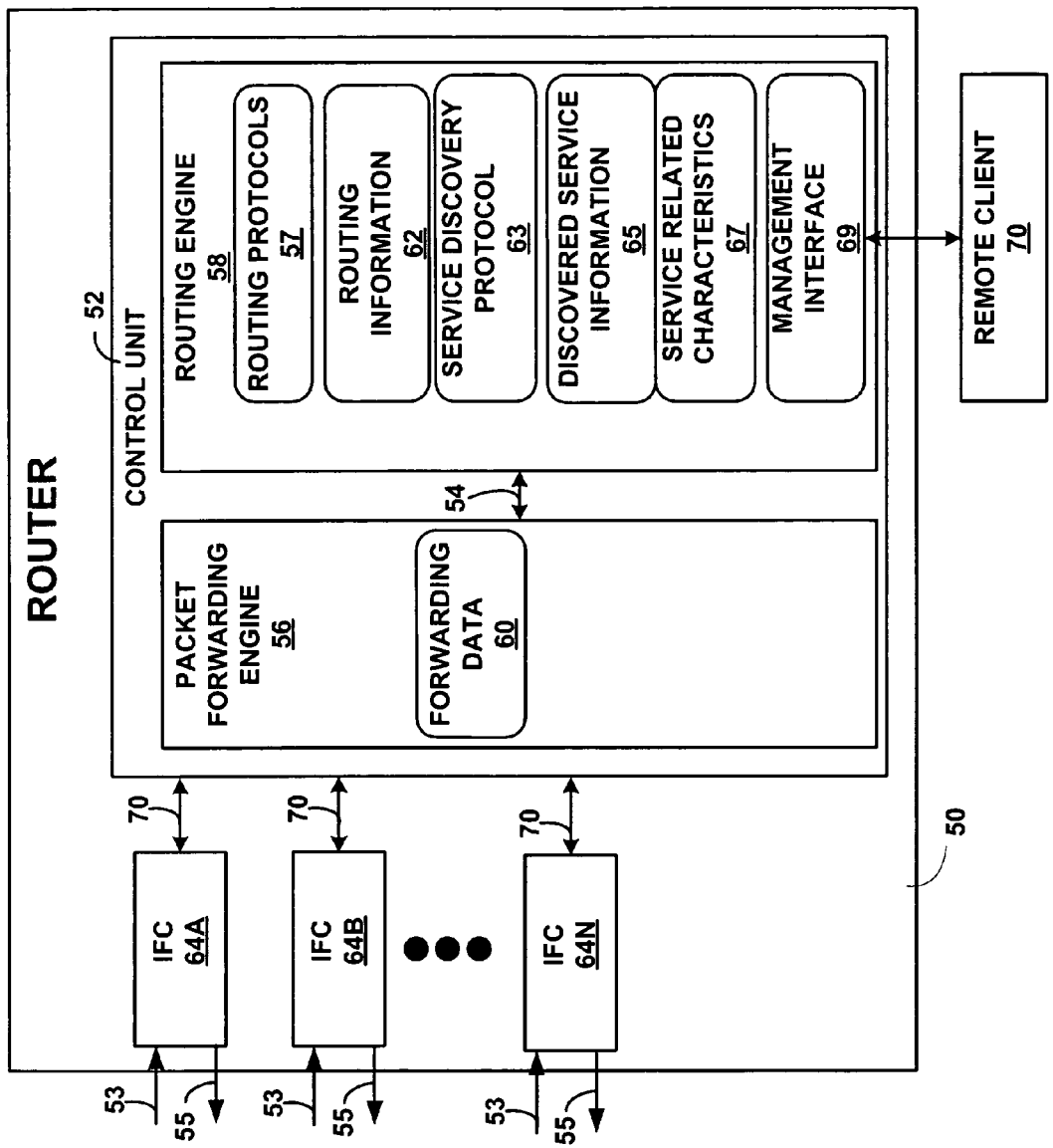
FIG. 4 is a block diagram illustrating another example embodiment of a router that may be configured to operate in accordance with the service discovery protocol and self-configuration techniques described herein.

FIG. 4 is a block diagram illustrating another example embodiment of a router 50 that may implement the service discovery protocol and automatic configuration techniques described herein.

In the illustrated embodiment, router 50 includes a control unit 52 that directs inbound packets received from inbound link 53 to the appropriate outbound link 55. In the illustrated embodiment, the functionality of control unit 52 is generally divided between a routing engine 58 and a packet-forwarding engine 56.

Routing engine 58 is primarily responsible for maintaining routing information 62 to reflect the current network topology based on routes learned from other routers, and provides an operating environment for routing protocols 57, which may include interior routing protocols and exterior routing protocols. Routing engine 58 generates forwarding data 60 in accordance with routing information 62 to associate destination information, such as IP address prefixes, with specific forwarding next hops (FNHs) and corresponding interface ports of IFCs 64. Forwarding data 60 may, therefore, be thought of as based on the information contained within routing information 62.

In response to topology changes, routing engine 58 analyzes routing information 62, and generates forwarding data 60 based on the affected routes. Routing engine 58 communicates forwarding data 60 to forwarding engine 56 for use in forwarding network packets. Routing engine 58 and packet forwarding engine 56 may maintain routing information 62 and forwarding data 60 in the form of one or more tables, databases, link lists, radix trees, databases, flat files, or other data structures.

Upon receiving an inbound packet, packet-forwarding engine 56 directs the inbound packet to an appropriate one or more of IFCs 64 for transmission based on forwarding data 60. In one embodiment, each of packet-forwarding engine 56 and routing engine 58 may comprise one or more dedicated processors, hardware, and the like, and may be communicatively coupled by data communication channel 54. Data communication channel 54 may be high-speed network connection, bus, shared-memory or other data communication mechanism.

Remote client 70 may interact with management interface 69 to send service related characteristics 67 to CPD 12. Control unit 52 stores the specified service related characteristics 67. Control unit 52 also includes service discovery protocol 63 and discovered service information 65, which are used along with service related characteristics 67 to implement the service discovery and automatic self-configuration techniques described herein.

Figure 5:
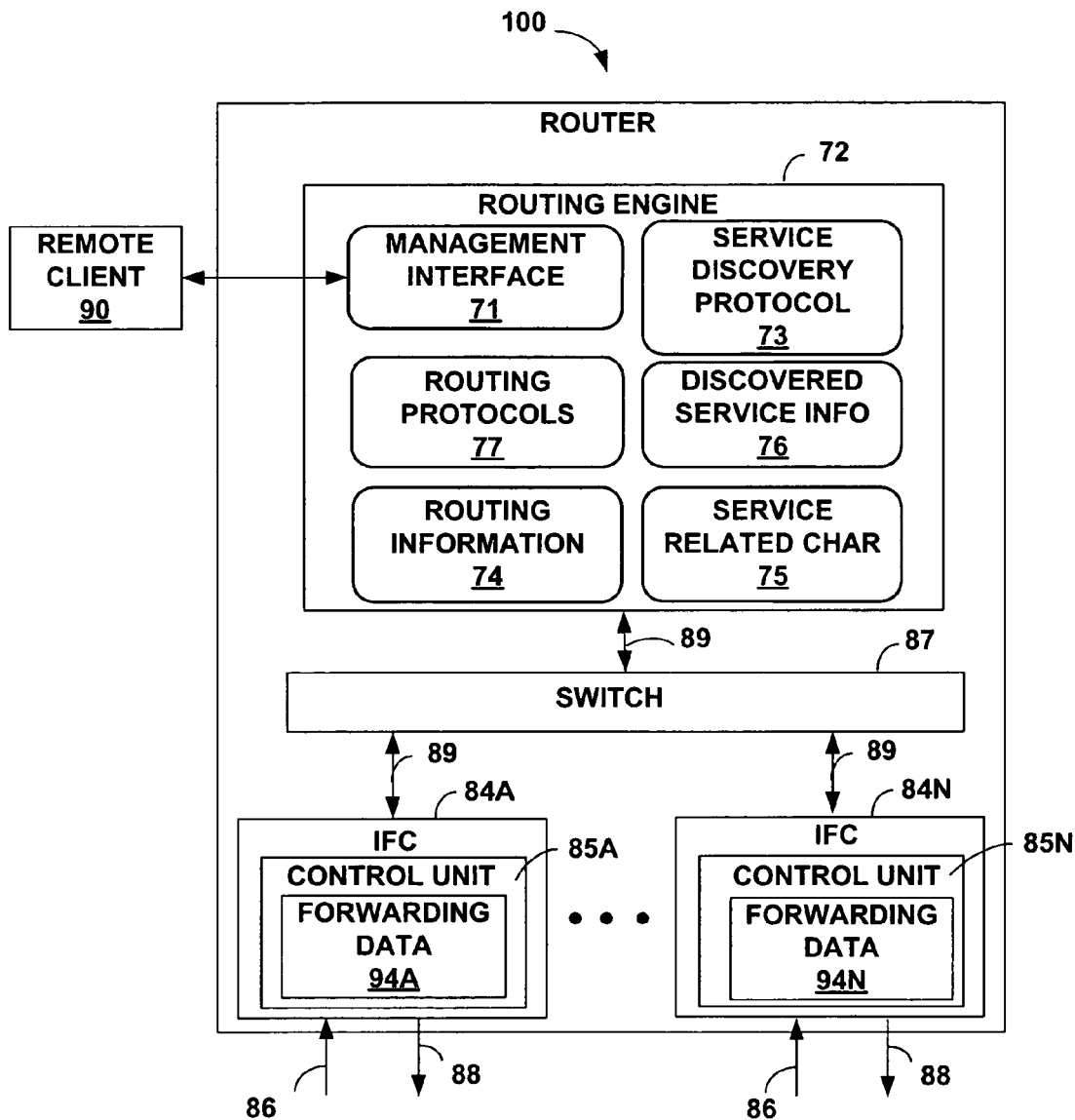
FIG. 5 is a block diagram illustrating another example embodiment of a router that may be configured to operate in accordance with the service discovery protocol and self-configuration techniques described herein.

FIG. 5 is a block diagram illustrating another embodiment of a router 100 that may implement the service/device discovery protocol and automatic self-configuration. In the illustrated embodiment, router 100 includes a routing engine 72 that maintains routing information 74 that describes the topology of the network to which it belongs. Routing engine 72 provides an operating environment for routing protocols 77, which may include interior routing protocols and exterior routing protocols. Routing engine 72 analyzes stored routing information 74 and generates forwarding information for IFCs 84A-84N. In other words, in contrast to the exemplary router 50 of FIG. 4, router 12 does not include centralized forwarding hardware. In particular, router 100 of FIG. 5 distributes the forwarding functionality to IFCs 84.

IFCs 84 receive and forward packets via network links 86 and 88, and are interconnected via a high-speed switch 87 and internal data paths 89. Switch 87 may comprise, for example, switch fabric, switchgear, a configurable network switch or hub, and the like. Data paths 89 may comprise any form of communication path, such as electrical paths within an integrated circuit, external data busses, optical links, network connections, wireless connections, and the like. IFCs 84 may be coupled to network links 86, 88 via a number of interface ports (not shown).

Each of the IFCs 84 may comprise a respective control unit 85A-85N ("85") that forwards packets in accordance with respective forwarding data 94A-94N ("94") generated by routing engine 72. Specifically, each of control units 85 determine a next hop for each inbound packet based on the forwarding data 94, identifies a corresponding one of IFCs 84 associated with the next hop, and relays the packet to the appropriate one of IFCs 84 via switch 87 and data paths 89.

Remote client 90 may provide service related characteristics 75 to router 100. Routing engine 72 stores the specified service related characteristics 75. Routing engine 72 also includes service discovery protocol 73 and discovered service information 76, which are used along with service related characteristics 75 to implement the service discovery and automatic self-configuration techniques as described above with respect to FIGS. 1, 2, and 3.

Various embodiments have been described. Although the techniques have been described as elements embodied within a network device, the described elements may be distributed to multiple devices. Also, although FIGS. 4 and 5 show embodiments of routers which support the service/device discovery protocol and automatic configuration techniques described herein, it shall be understood that any customer premise device could support the service/device discovery protocol and automatic configuration techniques. The term "system," is used herein to generally refer to embodiments of the invention in which the described elements are embodied within a single network device or distributed to multiple network devices. These and other embodiments are within the scope of the following claims.

The invention claimed is:

1. A method comprising:
   executing a service discovery protocol on a first customer premise device of a customer site network to communicate service related characteristics associated with the first customer premise device from the first customer premise device to a first public router of a service provider network, where the service related characteristics include information corresponding to a shared service provided by a service provider;
   in response to receiving the service related characteristics at the first public router of the service provider network, executing the service discovery protocol on the first public router to issue a plurality of queries to a plurality of other public routers of the service provider network to request identification information that identifies any other customer premise devices that are connected to those other public routers and that share the same service related characteristics as the first customer premise devices;
   in response to the queries, executing the service discovery protocol on the first public router to receive the identification information from at least two different ones of the other public routers of the service provider network, the information identifying the customer premise devices that are connected to the at least two different public routers and that share the same service related characteristics as the first customer premise device;
   executing the service discover protocol to communicate from the first public router to the first customer premise device the identification information obtained about the other customer premise devices that share the service related characteristics; and
   configuring the first customer premise device in accordance with the service related characteristics and the information obtained about the other customer premise devices to join the first customer premise device to the shared service.

2. The method of claim 1, wherein the service comprises at least one of an active performance measurement service, an inventory management service, a device management service, a Quality of Service (QoS) service, a security service, and a service level agreement.

3. The method of claim 1, wherein the service is a virtual private network service.

4. The method of claim 3, wherein the service related characteristics comprise at least one of a customer site identification, a virtual private network identification, a topology of a virtual private network, customer premise device information, an Internet Protocol address, quality of service information, a device virtual private network status, and a type of virtual private network.

5. The method of claim 1, wherein communicating service related characteristics from the first customer premise device to the first public router of a service provider network further comprise periodically communicating the service related characteristics from the first customer premise device to the first public router.

6. The method of claim 1, wherein communicating service related characteristics from the first customer premise device to the first public router of a service provider network further comprises communicating the service related characteristics from the first customer premise device to the first public router upon a receiving a service configuration update.

7. The method of claim 1, further comprising:
   communicating the service related characteristics associated with the first customer premise device to the other customer premise devices that share the same service related characteristics; and
   updating the configuration information of the shared service at the other customer premise devices to reflect the addition of the first customer premise device to the shared service.

8. The method of claim 1, wherein executing the service discovery protocol on the first public router to issue a plurality of queries comprises outputting the plurality of queries in accordance with the service discovery protocol to query each of the plurality of other public routers of the public network.

9. The method of claim 8, further comprising:
   upon receiving the queries with the other public routers, identifying, with each of the other public routers, the customer premise device coupled to the respective other public routers that have the same service related characteristics as included in the query from the first public router; and executing the service discovery protocols with the other public routers to send, with each of the other public routers, a response to first public router that includes the identification information associated with customer premise devices that were identified as sharing the service related characteristics included in the query.

10. The method of claim 1, further comprising automatically configuring, with the first customer premise device, performance measurement sessions between the first customer premise device and each of the other customer premise devices identified as sharing the same service related characteristics.

11. A method comprising:

receiving, with a first public router of a service provider network, a communication from a first customer premise device of a customer site network that includes service related characteristics are associated with the first customer premise and correspond to a shared service provided by a service provider of the service provider network;

querying, with the first public router, a plurality of other public routers to obtain information about at least one other customer premise device that shares the same service related characteristics as the first customer premise device; and communicating the discovered information about the at least one other customer premise device to the first customer premise device.

12. The method of claim 11, wherein receiving a communication comprises receiving a communication in accordance with a service discovery protocol.

13. The method of claim 11, wherein the service is a virtual private network service.

14. The method of claim 11, wherein the service comprises at least one of an active performance measurement service, an inventory management service, a device management service, a Quality of Service (QoS) service, a security service, and a service level agreement.

15. The method of claim 11, further comprising:

storing, with the first public router, service related characteristics associated with the first customer premise device;

receiving, with the first public router, a query from one of the plurality of other public routers to obtain information about any customer premise devices coupled to the first public router that have the same service related characteristics as included in the query; and sending a response to the query that includes information associated with at least the first customer premise device to the querying public router.

16. The method of claim 15, further communicating the service related characteristics included in the query to the first customer premise device.

17. A network device of a service provider network, the device comprising a control unit that implements a service discovery protocol to receive a communication from a first customer premise device of a customer site network that includes service related characteristics associated with the first customer premise device, querying a plurality of other public routers of the service provider network to obtain information about at least one other customer premise device that shares the same service related characteristics as the first customer device, and communicate the information obtained about the at least one other customer premise device to the first customer premise device.

18. The network device of claim 17, wherein the control unit automatically updates a configuration of a shared service of the network device based on the service related characteristics and the information.

19. The network device of claim 18, wherein the shared service comprises at least one of an active performance measurement service, an inventory management service, a device management service, a security service, and a service level agreement.

20. The network device of claim 18, wherein the service is a virtual private network service.

21. The network device of claim 20, wherein the service related characteristics comprise at least one of a site identification, a virtual private network identification, a topology of a virtual private network, customer premise device information, Internet Protocol address, quality of service information, device virtual private network status, and type of virtual private network.

22. The network device of claim 17, further comprising a data structure to store the service related characteristics associated with the first customer premise device, wherein the control unit receives a query from one of the plurality of other public routers to obtain information about any customer premise devices coupled to the first public router that have the same service related characteristics as included in the query and sends a response to the query that includes information associated with at least the first customer premise device to the querying public router.

23. The network device of claim 22, wherein the control unit communicates the service related characteristics included in the query to the first customer premise device.

24. A customer premise device of a customer site network, the device comprising a control unit that includes a communication manager that communicates service related characteristics associated with the customer premise device to a first public router of a service provider network and receives information about at least one other customer premise device that shares the service related characteristics from the first public router, wherein the information about the at least one other customer device is obtained by the first public router by querying a plurality of other public routers of the service provider network; and a service manager that configures the customer premise device in accordance with the service related characteristics and the information obtained about the other customer premise devices to join the customer premise device to a shared service.

25. The device of claim 24, wherein the communication manager operates in accordance with a service discovery protocol to communicate the service related characteristics associated with the customer premise device and obtain information about the at least one other customer premise device that shares the service related characteristics.

26. The device of claim 24, wherein the service is a virtual private network service.

27. The device of claim 24, wherein the service comprises at least one of an active performance measurement service, an inventory management service, a device management service, a Quality of Service (QoS) service, a security service, and a service level agreement.

28. The device of claim 24, wherein the customer premise device comprises a router.

29. The device of claim 24, further comprising a management interface that receives the service related characteristics from a human administrator and stores the service related characteristics within the customer premise device.

30. The device of claim 24, wherein the service manager configures performance measurement sessions between the customer premise device and each of the other customer premise devices identified as sharing the same service related characteristics.

31. A computer-readable medium comprising instructions to cause a processor to:
receive, with a first public router of a service provider network, a communication from a first customer premise device of a customer site network that includes service related characteristics associated with the first customer premise device;
query, with the first public router, a plurality of other public routers to obtain information about at least one other customer premise device that shares the same service related characteristics as the first customer premise device; and
communicate, with the first public router, the information obtained for the at least one other customer premise device to the first customer premise device.

32. The computer-readable medium of claim 31, further comprising instructions to cause a processor to:
receive a query from one of the plurality of other public routers to obtain information about any customer premise devices coupled to the first public router that have the same service related characteristics included in the query; and
sending a response to the query that includes information regarding at least the first customer premise device to the querying public router.

33. The computer-readable medium of claim 32, further comprising instructions to cause a processor to communicate the service related characteristics included in the query to the first customer premise device.

34. The computer-readable medium of claim 31, wherein the service comprises at least one of active an active performance measurement service, an inventory management service, a device management service, a Quality of Service (QoS) service, a security service, and a service level agreement.

35. The computer-readable medium of claim 31, wherein the service is a virtual private network service.

36. A system comprising:
a plurality of public routers of a service provider network; and
a plurality of customer premise devices coupled to the public routers,
wherein a first one of the plurality of public routers receives a communication from a first one of the plurality of customer premise devices that includes service related characteristics associated with the first customer premise device, queries the other public routers to obtain information about one or more other customer premise devices that share the same service related characteristics as the first customer premise device, and communicates the information obtained about the one or more other customer premise devices to the first customer premise device,
wherein a control unit of the first customer premise device configures the first customer premise device in accordance with the service related characteristics and the information obtained about the one or more other customer premise devices to join the first customer premise device to a shared service.

37. The system of claim 36, wherein:
the first public router sends a query to each of the plurality of other public routers that includes the service related characteristics associated with the first customer premise device;
each of the other public routers receives the query, identifies customer premise devices coupled to the respective other public routers that have the same service related characteristics as included in the query from the first public router, and sends a response to first public router that includes information associated with customer premise devices identified as sharing the service related characteristics included in the query.

38. The system of claim 37, wherein:
each of the other public routers communicates the service related characteristics included in the query to the identified customer premise devices that share the same service related characteristics; and
each of the identified customer premise devices updates the configuration information of the shared service to reflect the addition of the first customer premise device to the shared service.

39. The system of claim 36, wherein the control unit of the first customer premise device configures performance measurement sessions between the first customer premise device and each of the other customer premise devices identified as sharing the same service related characteristics.

40. The system of claim 36, wherein the first customer premise device periodically communicates the service related characteristics from the first customer premise device to the first public router.

41. The system of claim 36, wherein the first customer premise device establishes a tunnel with at least one of the other customer premise devices identified as having the same service related characteristics.

42. The system of claim 36, wherein the first customer premise device configures performance measurement sessions between the customer premise device and each of the other customer premise devices identified as sharing the same service related characteristics.

43. The system of claim 36, wherein the first customer premise device communicates the service related characteristics from the first customer premise device to the first public router upon a receiving a service configuration update.

44. A method comprising:
communicating, with a first customer premise device of a customer site network, service related characteristics associated with the first customer premise device to a first public router of a service provider network;
receiving, with the first customer premise device, information about at least one other customer premise device that shares the service related characteristics from the first public router, wherein the information about the at least one other customer device is obtained by the first public router by querying a plurality of other public routers of the service provider network; and
configuring the first customer premise device in accordance with the service related characteristics associated with the first customer premise device and the information obtained about the other customer premise devices to join the first customer premise device to a shared service.

45. The method of claim 44, wherein configuring the first customer premise device to join the first customer premise device to the shared service comprises establishes a tunnel with at least one of the other customer premise devices identified as having the same service related characteristics to join the customer premise device to a virtual private network.

46. The method of claim 44, wherein configuring the first customer premise device to join the first customer premise device to the shared service comprises configuring the first customer premis device establish performance measurement sessions between the customer premise device and each of the other customer premise devices identified as sharing the same service related characteristics.

* * * * *

UNITED STATES PATENT AND TRADEMARK OFFICE
CERTIFICATE OF CORRECTION

| | |
|---|---|
| PATENT NO. | : 7,421,483 B1 |
| APPLICATION NO. | : 10/770113 |
| DATED | : September 2, 2008 |
| INVENTOR(S) | : Sanjay Kalra |

It is certified that error appears in the above-identified patent and that said Letters Patent is hereby corrected as shown below:

Column 10, line 4 (Claim 1), "devices;" should read -- device; --

Column 10, line 67 (Claim 9), "premise device coupled" should read -- premise devices coupled --

Column 12, line 1 (Claim 17), "customer device," should read -- customer premise device --

Column 16, line 2 (Claim 46), "customer premis device" should read -- customer premise device --

Signed and Sealed this

Fifth Day of October, 2010

David J. Kappos
*Director of the United States Patent and Trademark Office*